United States Patent
Raymond (10) Patent No.: US 11,682,888 B2
(45) Date of Patent: *Jun. 20, 2023

(54) RADIO FREQUENCY TRANSMISSIVE RAISED ACCESS FLOOR PANEL

(71) Applicant: Raymond & Lae Engineering, Inc., Fort Collins, CO (US)

(72) Inventor: Donald M. Raymond, Fort Collins, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/235,036

(22) Filed: Apr. 20, 2021

(65) Prior Publication Data

US 2021/0242673 A1  Aug. 5, 2021

Related U.S. Application Data

(62) Division of application No. 16/745,225, filed on Jan. 16, 2020, now Pat. No. 11,063,415.

(60) Provisional application No. 62/793,223, filed on Jan. 16, 2019.

(51) Int. Cl.
*H02G 3/38* (2006.01)
*E04F 15/024* (2006.01)

(52) U.S. Cl.
CPC ....... *H02G 3/285* (2013.01); *E04F 15/02417* (2013.01); *E04F 15/02452* (2013.01); *E04F 15/02464* (2013.01); *E04F 15/02494* (2013.01)

(58) Field of Classification Search
CPC .............. H02G 3/285; E04F 15/02417; E04F 15/02452; E04F 15/02494; E04F 15/02464; H04Q 2201/00; H04Q 2209/47
See application file for complete search history.

(56) References Cited

U.S. PATENT DOCUMENTS

| | | | | |
|---|---|---|---|---|
| 4,638,115 A ‡ | 1/1987 | Benscoter | .............. | H02G 3/185 174/482 |
| 5,010,211 A ‡ | 4/1991 | Bartee | ................... | H02G 3/185 174/488 |
| 5,049,700 A ‡ | 9/1991 | Kobayashi | ........ | E04F 15/02435 174/482 |
| 5,389,737 A ‡ | 2/1995 | Kobayashi | ........ | E04F 15/02435 174/483 |

(Continued)

FOREIGN PATENT DOCUMENTS

| | | | | |
|---|---|---|---|---|
| DE | 202007017236 U1 ‡ | 4/2009 | ........ | E04F 15/02452 |
| GB | 2534994 A * | 8/2016 | ........ | E04F 15/02405 |
| WO | WO-2017046587 A1 * | 3/2017 | .............. | E04F 15/02 |

*Primary Examiner* — Rodney Mintz
(74) *Attorney, Agent, or Firm* — Cochran Freund & Young LLC; William W. Cochran (57) ABSTRACT

Disclosed is a sensor floor tile that utilizes a RF frequency transmissive disk that transmits sensor data from sensors located in a plenum of a raised floor system. An antenna is located adjacent to the disk so that sensor signals can be transmitted from the sensor located in the plenum under the floor tile to a wireless receiver located in an elevated location in a data center room, a computer room, a clean room, an office space, etc. A network connection can also be provided by the antenna when the antenna is connected to a router in the plenum.

30 Claims, 9 Drawing Sheets

(56) References Cited

U.S. PATENT DOCUMENTS

| | | | | |
|---|---|---|---|---|
| 5,392,571 | A ‡ | 2/1995 | Greenfield | E04F 15/02447 52/126.2 |
| 5,440,841 | A ‡ | 8/1995 | Greenfield | E04F 15/02447 52/126.2 |
| 5,467,609 | A ‡ | 11/1995 | Feeney | E04F 15/02411 52/220.2 |
| 5,628,157 | A * | 5/1997 | Chen | E04F 15/02458 52/263 |
| 5,927,030 | A ‡ | 7/1999 | Petit | H02G 3/285 52/220.1 |
| 5,992,108 | A * | 11/1999 | Falcey | H02G 3/185 52/220.8 |
| 6,061,982 | A ‡ | 5/2000 | Owen | H02G 3/285 52/126.4 |
| 6,102,229 | A ‡ | 8/2000 | Moncourtois | H02G 3/285 220/3.3 |
| 6,144,209 | A * | 11/2000 | Raymond | G01M 3/165 174/11 R |
| 6,202,374 | B1 ‡ | 3/2001 | Cooper | E04B 5/48 52/126.3 |
| 6,508,037 | B1 ‡ | 1/2003 | Owen | H02G 3/285 52/126.4 |
| 6,550,195 | B1 ‡ | 4/2003 | Cooper | E04B 5/48 52/126.3 |
| 6,632,999 | B2 ‡ | 10/2003 | Sempliner | E04F 15/02405 160/19 |
| 6,637,161 | B1 ‡ | 10/2003 | Buchalter | E04F 15/02447 52/126.6 |
| 7,081,759 | B2 * | 7/2006 | Raymond | G01M 3/165 324/544 |
| 7,212,009 | B2 * | 5/2007 | Raymond | G01M 3/165 324/544 |
| 7,481,029 | B2 * | 1/2009 | McQuilken | H04Q 1/035 200/51 R |
| 7,928,602 | B2 ‡ | 4/2011 | Heidmann | E04F 15/02 307/42 |
| 8,063,309 | B2 * | 11/2011 | Raymond | H01R 43/005 174/113 R |
| 8,234,910 | B2 * | 8/2012 | Raymond | G01M 3/165 73/40 |
| 8,256,269 | B2 * | 9/2012 | Raymond | G01M 3/165 73/40 |
| 8,590,219 | B2 ‡ | 11/2013 | Meyer | E04F 15/02458 52/126.6 |
| 8,601,679 | B2 * | 12/2013 | Raymond | H01R 43/005 29/874 |
| 8,761,417 | B2 ‡ | 6/2014 | Oser | H04R 5/023 381/152 |
| 8,863,471 | B2 ‡ | 10/2014 | Pfluger | E04F 15/02488 52/745.13 |
| 9,420,042 | B2 * | 8/2016 | Raymond | H04L 67/12 |
| 9,691,240 | B2 * | 6/2017 | Bradford | G08B 13/10 |
| 9,755,389 | B2 * | 9/2017 | Raymond | H01R 43/005 |
| 9,812,758 | B2 * | 11/2017 | Burrell | H01Q 1/40 |
| 9,975,309 | B2 * | 5/2018 | Patel | F16B 5/01 |
| 9,986,210 | B2 * | 5/2018 | Rodriguez | H04N 23/11 |
| 10,106,990 | B2 ‡ | 10/2018 | Drewery | E04F 15/02405 |
| 10,119,278 | B1 ‡ | 11/2018 | Canfield | E04F 17/08 |
| 10,161,141 | B2 ‡ | 12/2018 | Canfield | E04F 15/02458 |
| 10,267,047 | B2 ‡ | 4/2019 | Canfield | E04B 5/43 |
| 10,280,630 | B2 ‡ | 5/2019 | Canfield | E04F 15/02452 |
| 10,280,631 | B2 ‡ | 5/2019 | Canfield | E04F 15/02458 |
| 10,280,632 | B2 ‡ | 5/2019 | Canfield | E04F 15/02452 |
| 10,333,370 | B2 ‡ | 6/2019 | Webster | E04F 15/02 |
| 10,557,460 | B2 ‡ | 2/2020 | Webster | A43B 3/0015 |
| 10,801,216 | B1 * | 10/2020 | Anderson | H02G 3/383 |
| 10,858,845 | B1 ‡ | 12/2020 | Majewski | H04R 1/028 |
| 10,965,155 | B2 * | 3/2021 | Jahn | H01F 38/14 |
| 11,063,415 | B2 * | 7/2021 | Raymond | E04F 15/02494 |
| 11,101,692 | B2 * | 8/2021 | Soder | B60L 53/12 |
| 11,404,908 | B2 * | 8/2022 | Böser | B60L 53/12 |
| 2004/0163350 | A1 ‡ | 8/2004 | Huang | E04F 15/02452 52/506.06 |
| 2006/0162269 | A1 ‡ | 7/2006 | Pacione | A47G 27/0468 52/403.1 |
| 2006/0171570 | A1 ‡ | 8/2006 | Brendley | G08B 13/10 382/115 |
| 2007/0069021 | A1 ‡ | 3/2007 | Elrod | G06K 17/00 235/451 |
| 2009/0010468 | A1 ‡ | 1/2009 | Oser | H04R 5/023 381/332 |
| 2009/0267741 | A1 ‡ | 10/2009 | Li | G05D 1/0261 340/10.1 |
| 2014/0102012 | A1 ‡ | 4/2014 | Pfluger | E04F 15/02452 52/1 |
| 2015/0365630 | A1 * | 12/2015 | Rodriguez | H04N 23/50 348/82 |
| 2016/0118707 | A1 * | 4/2016 | Burrell | H01Q 1/40 343/720 |
| 2016/0217664 | A1 * | 7/2016 | Bradford | H04Q 9/00 |
| 2017/0080674 | A1 * | 3/2017 | Patel | B32B 3/266 |
| 2018/0202171 | A1 ‡ | 7/2018 | Drewery | E04F 15/02452 |
| 2018/0313096 | A1 ‡ | 11/2018 | Voelpel | F21V 33/006 |
| 2018/0313558 | A1 ‡ | 11/2018 | Byers | E04B 9/04 |
| 2018/0342929 | A1 ‡ | 11/2018 | Webster | E04F 15/02 |
| 2019/0048858 | A1 ‡ | 2/2019 | Webster | A43B 3/0015 |
| 2020/0173177 | A1 ‡ | 6/2020 | Stillig | E04F 15/02405 |
| 2020/0287412 | A1 * | 9/2020 | Jahn | B60L 53/30 |
| 2020/0308848 | A1 ‡ | 10/2020 | Stillig | G05D 1/0234 |
| 2020/0395783 | A1 ‡ | 12/2020 | Böser | H04B 5/0081 |
| 2020/0403392 | A1 * | 12/2020 | Raymond | E04F 15/02452 |
| 2021/0025177 | A1 * | 1/2021 | Anderson | E04F 15/02435 |
| 2021/0025178 | A1 * | 1/2021 | Anderson | H02G 3/0437 |
| 2021/0091596 | A1 * | 3/2021 | Soder | B60L 53/12 |
| 2021/0194229 | A1 * | 6/2021 | Raymond | E04F 15/02405 |
| 2022/0171949 | A1 * | 6/2022 | Xu | G06K 19/07786 |

\* cited by examiner
‡ imported from a related application

Fig. 9

RADIO FREQUENCY TRANSMISSIVE RAISED ACCESS FLOOR PANEL

BACKGROUND

Floor tiles are used in raised flooring systems, that are prevalent in data centers, clean rooms and various computer rooms that contain servers and complex, high-speed computers. Raised flooring systems are also used in office buildings, apartments and high rise buildings used for various purposes. One of the advantages of using a raised flooring system is that all of the utilities can be run in the plenum under the floor tiles, which makes the utilities easily accessible. In addition, air conditioning and heating can be run through the plenum under the tile, which removes the necessity of running separate duct work. Furthermore, carpet tiles and wood coverings can be placed over the floor tiles to provide a pleasing appearance for offices and apartments. Because of the ease of access to the utilities in the plenum under the floor tiles and other advantages provided by a raised floor system, raised floor systems using floor tiles have found widespread use and such use is increasing.

SUMMARY

The present invention may therefore comprise a floor tile comprising: a metal floor tile having an opening that extends from a top surface to a bottom surface of the floor tile; a sensor located below the floor tile that generates electrical sensor signals; a transmitter that generates radio frequency signals in response to the electrical sensor signals; a flange plate that is mounted to the bottom surface of the floor tile at a predetermined distance below the top surface of the floor tile; an insert disposed in the opening and placed against the flange plate, the insert having a thickness that corresponds to the predetermined distance so that the insert is flush with the top surface of the floor tile when the insert is disposed in the opening and placed against the flange plate, the insert made from a material that has high transmissivity of the radio frequency signals; an antenna disposed adjacent to the insert that is adapted to wirelessly transmit the radio frequency signals; wherein the radio frequency signals are wirelessly transmitted from the antenna through the insert.

An embodiment of the present invention may further comprise a method of transmitting sensor data in a raised floor system comprising: providing a floor tile with a top surface and a bottom surface and an opening that extends through the thickness of the floor tile between the top surface and the bottom surface; generating sensor signals from a sensor located below the floor tile; generating radio frequency signals from an antenna in response to the sensor signals; mounting a flange plate on the bottom surface of the floor tile at a predetermined distance below the top surface; placing an insert in the opening that rests on the flange plate, the insert having a thickness that corresponds to the predetermined distance so that a top surface of the insert is flush with the top surface of the floor tile when the insert is disposed in the opening, the insert being transmissive to the radio frequency signals; securing the antenna under the insert when the insert is disposed in the opening so that the radio frequency signals are transmitted through the insert.

An embodiment of the present invention may further comprise a floor tile comprising: a metal floor tile having an opening that extends from a top surface to a bottom surface of the floor tile; a bracket flange connected to the floor tile; a plate flange that is disposed a predetermined distance below the top surface of the floor tile; a sensor located below the floor tile that generates electrical sensor signals; a transmitter that generates radio frequency signals in response to the electrical sensor signals; an insert disposed in the opening and placed against the plate flange, the insert having a thickness that corresponds to the predetermined distance so that the insert is flush with the top surface of the floor tile, the insert made from a material having high transmissivity of radio frequency signals; an antenna connected to the transmitter that transmits the radio frequency signals through the insert.

An embodiment of the present invention may further comprise a method of transmitting sensor data in a raised floor system comprising: providing a metal floor tile with a top surface and a bottom surface and an opening that extends through a thickness of the floor tile between the top surface and the bottom surface; generating sensor signals from a sensor; generating radio frequency signals from an antenna in response to the sensor signals; connecting a bracket flange to the floor tile, the bracket flange having a plate flange so that the plate flange extends into the opening and is located at a predetermined distance below the top surface of the floor tile; placing an insert in the opening such that the insert rests on the plate flange, the insert having a thickness that corresponds to the predetermined distance so that a top surface of the insert is flush with the top surface of the floor tile, the insert made from a material having high transmissivity of radio frequency signals; transmitting the radio frequency signals from the antenna through the insert.

DETAILED DESCRIPTION OF THE EMBODIMENTS

Figure 1:
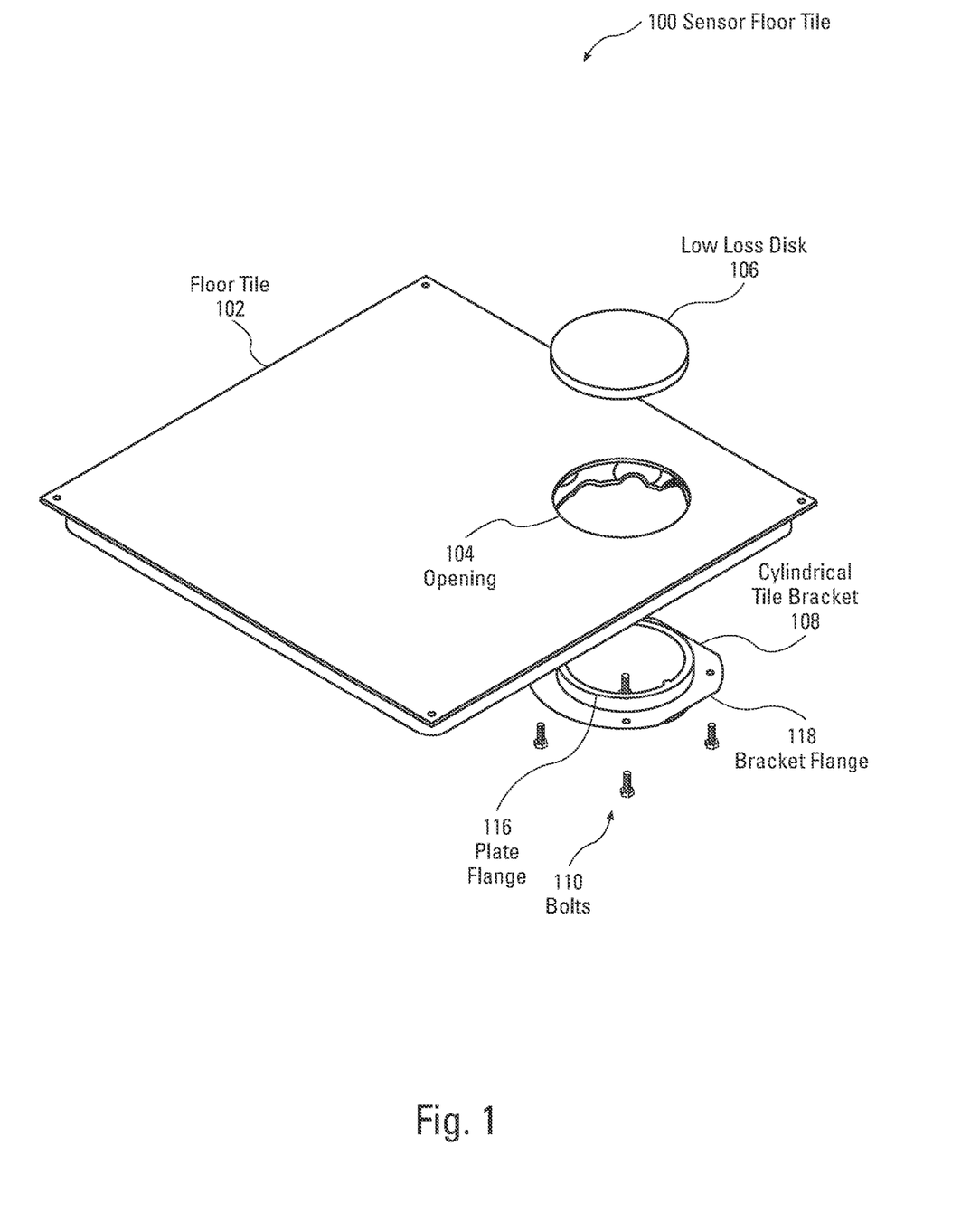
FIG. 1 is a top isometric exploded view of portions of an embodiment of a sensor floor tile.

FIG. 1 is a top isometric, exploded view of an embodiment of portions of a sensor floor tile 100. As illustrated in FIG. 1, floor tile 102 has an opening 104 that extends through the entire thickness of the floor tile 102. A cylindrical tile bracket 108 extends up through the opening 104 and a low loss disk 106 fits within the opening 104 and rests on the plate flange 116 of the cylindrical tile bracket 108. Various materials can be used for the low loss disk 106 that provide low losses to the transmission radio frequency (rf) energy. For example, many plastics provide low loss to the transmission of rf energy and simultaneously provide the strength and durability needed for the opening 104 in the floor tile 102. One example is calcium carbonate which is a high strength plastic with low loss characteristics. Other materials can also be used such as glass, tempered glass, fiberglass, wood, wood and plastic mixtures, concrete or any other nonconductive material which is capable of transmitting radio frequency signals. In that regard, transmission of ir signals could also be used using a disk 106 that is transmissive to ir signals. The cylindrical tile bracket 108 has a bracket flange 118 that fits on the underside of the floor tile 102 and has holes to secure the cylindrical tile bracket 108 by bolts 110 through the bracket flange 118. As shown in FIG. 1, floor tile 102 is a standard floor tile that is solid and can be retrofitted with the cylindrical tile bracket 108 and low loss disk 106 by forming the opening 104 in the floor tile 102.

Figure 2:
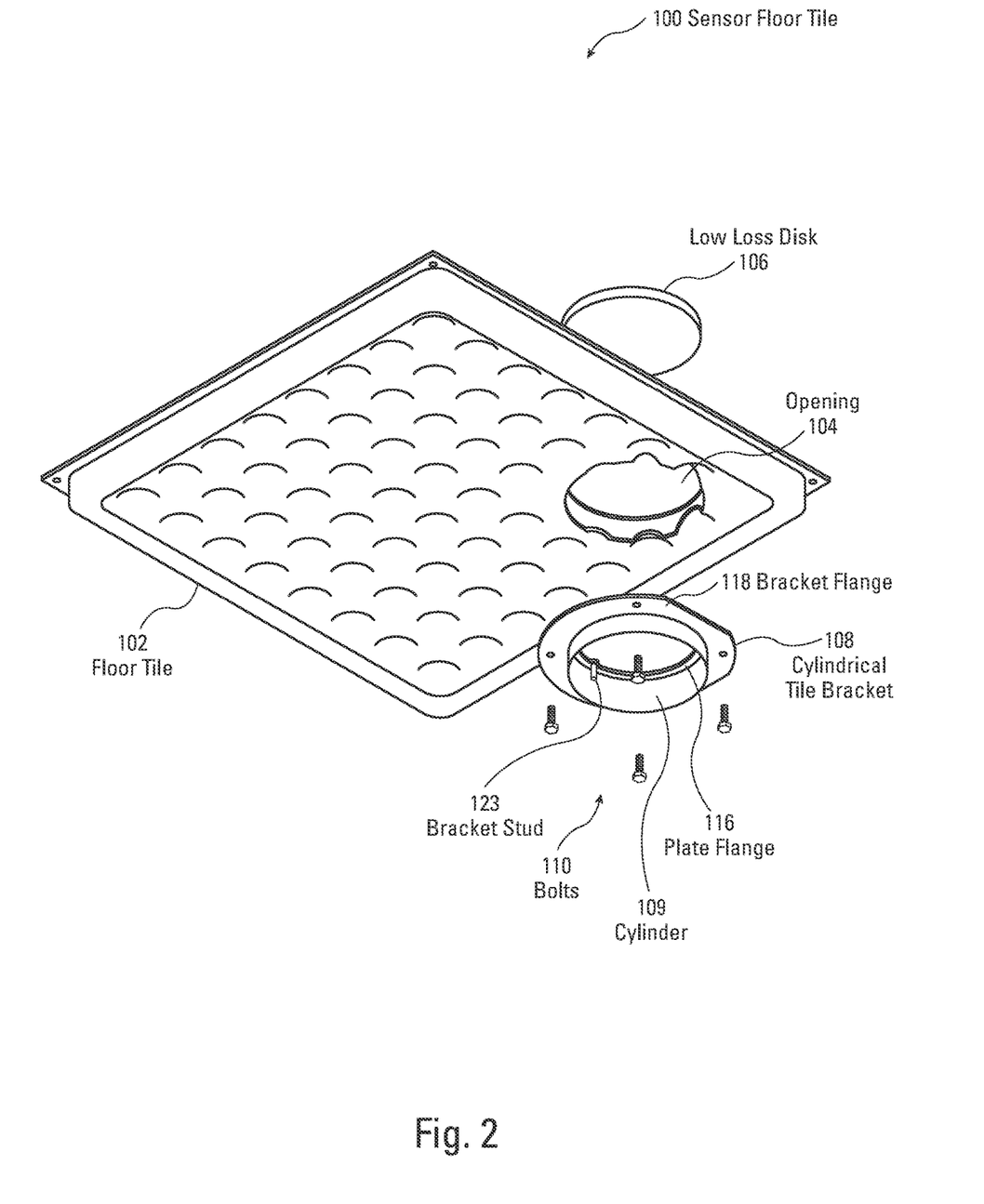
FIG. 2 is a bottom isometric exploded view of portions of an embodiment of a sensor floor tile.

FIG. 2 is an isometric, bottom exploded view of the sensor floor tile 100. As illustrated in FIG. 2, the floor tile 102 has the opening 104 that extends through the entire thickness of the floor tile 102. The cylindrical tile bracket 108 has a cylinder portion 109 that fits within the opening 104. The cylinder 109 then extends downwardly past the bracket flange 118. The bracket flange 118 is mounted between the top and bottom of the cylinder 109. In this manner, the cylinder 109 extends partway through the opening 104 in the floor tile 102. The top portion of the cylinder 109 includes a ring which is a plate flange 116. The plate flange 116 provides a cylindrical flat surface on which the low loss disk 106 rests. The distance in which the cylinder 109 extends through the opening 104 and the thickness of the plate flange 116 allow the low loss disk 106 to be inserted in the opening 104 and to be flush with the top surface of the floor tile 102. Bolts 110 extend through openings in the bracket flange 118 and are secured to the bottom surface of the floor tile 102 to hold the cylindrical tile bracket 108 securely to the floor tile 102. Bracket stud 123 and a similar bracket stud 125 (FIG. 3) hold mounting bracket 114 (FIG. 3).

Figure 3:
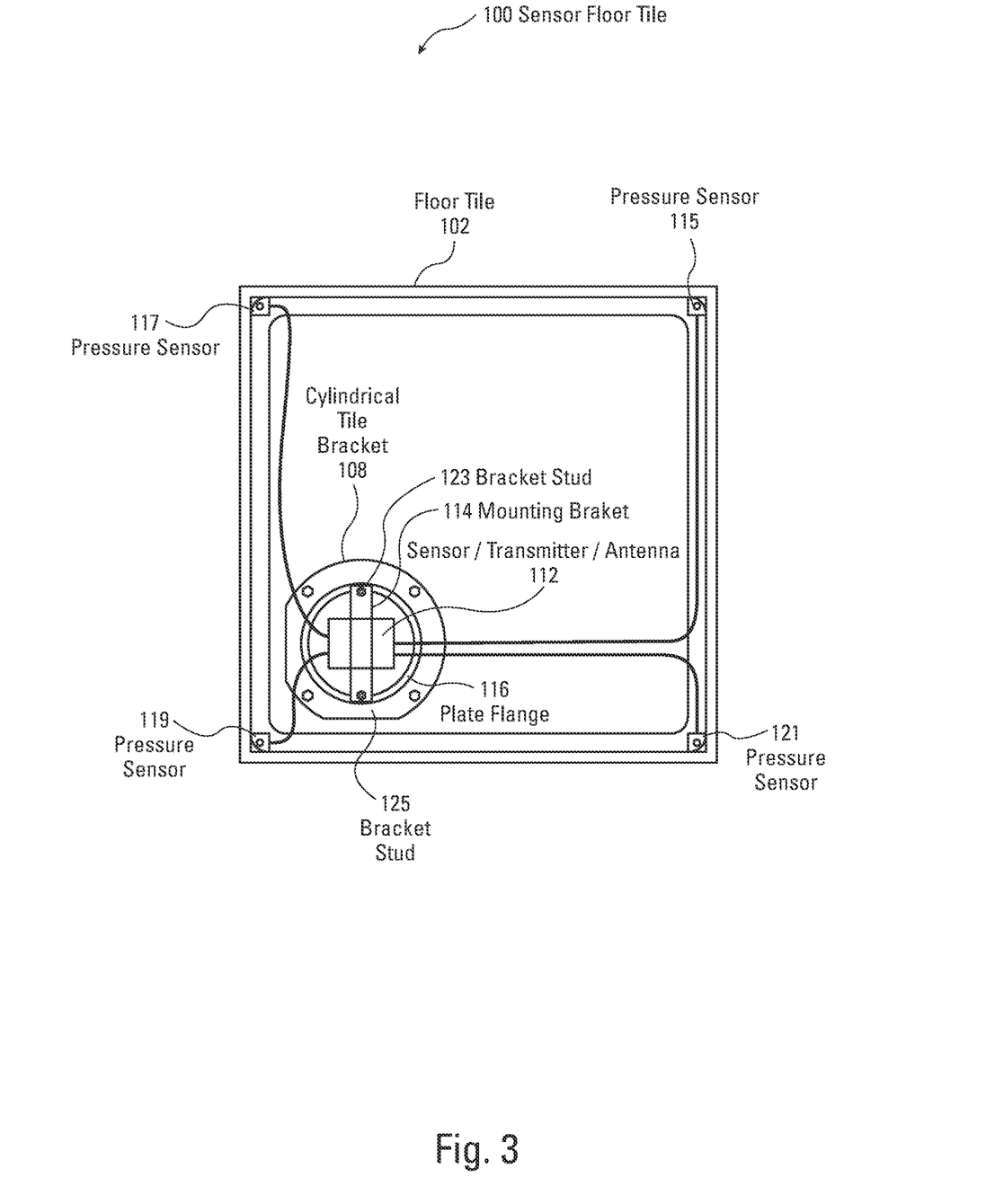
FIG. 3 is a bottom view of portions of an embodiment of a sensor floor tile.

FIG. 3 is a bottom view of the sensor floor tile 100 illustrating various sensors mounted in the sensor floor tile 100. As illustrated in FIG. 3, the cylindrical tile bracket 108 is mounted on the bottom surface of the floor tile 102. A mounting bracket 114 is mounted to the bottom surface of the plate flange 116 using bracket studs 123, 125. The mounting bracket 114 holds the sensor/transmitter/antenna 112 in position against the bottom surface of the low loss disk 106. The sensor/transmitter/antenna 112 may embody a number of different devices. In one implementation, the sensor/transmitter/antenna 12 may simply be an antenna that is capable of transmitting rf signals generated by a sensor. As disclosed below, the rf signals are detected by a receiver in the room which may detect a number of different signals from various floor tiles such as floor tile 102. In another implementation, a sensor may be connected to the sensor/transmitter/antenna 112 and the sensor/transmitter/antenna 112 may comprise a transmitter and antenna that detects the sensor signal, amplifies the sensor signal and transmits the sensor signal through an embedded antenna. In another implementation, the sensor/transmitter/antenna 112 may include integrated sensors that detect various conditions and environmental factors surrounding the floor tile 102. Various types of sensors that may be included internally within the sensor/transmitter/antenna 112. For example, integrated sensors may include temperature sensors that sense the temperature of the surrounding area. Another example of an internal sensor in the sensor/transmitter/antenna 112 would be a temperature and humidity sensor that detects both the temperature and the humidity surrounding the sensor/transmitter/antenna 112. In addition, differential air pressure can be detected by including a sensor that is connected to both the plenum and the above floor pressure so that a differential air pressure signal can be generated and transmitted through the sensor/transmitter/antenna 112.

Various types of external sensors can also be connected to the sensor/transmitter/antenna 112 illustrated in FIG. 3. As shown in FIG. 3, pressure sensors 115, 117, 119, 121 and located in the corner positions of floor tile 102. The pressure sensors 115, 117, 119, 121 generate a signal that is applied to the sensor/transmitter/antenna 112 when pressure is sensed on a corner of the floor tile 102. In this manner, the antenna can generate a signal indicating that pressure has been detected on a particular corner of the floor tile 102, so that movement over the floor tile 102 can be detected. The pressure sensors 115-121 can be piezo-electric sensors or other types of pressure or force sensors. The pressure sensors 115-121, illustrated in FIG. 3, operate in response to pressure on the floor tile, such as a person walking on a floor tile. Since these may constitute piezoelectric sensors, the pressure sensors 115-121 may require little or no power to generate an electrical signal. In this manner, it is easy to detect unauthorized access to portions of a computer room by simply tracking the movement indicated by the pressure sensors.

Other types of external sensors can also be connected to the sensor/transmitter/antenna 112 shown in FIG. 3, which may function simply as a transmitter and antenna, or simply an antenna. For example, leak detectors may be connected to the sensor/transmitter/antenna 112 which detect leaks in the plenum 128 (FIG. 4), as disclosed in more detail below. Other types of external sensors may include thermistors which are capable of accurately sensing the temperature in the plenum. Resistance temperature devices (rtds) can also be used to accurately determine temperatures that exist within the plenum below the floor tile 102. In addition, air flow transducers can be connected to the sensor/transmitter/antenna 112 which detect the flow of air in the plenum at different locations. This information can be important in tracking the cooling or flow of air in the plenum, which is necessary to cool computer equipment that may be located above the floor tile 102.

In one embodiment of the invention a plastic disk is used for the low loss disk 106 which is one half inch thick and has a diameter of 6 inches. Although various plastic materials can be used for the plastic disks, polycarbonate is a good material because of its high tensile strength, high durability and low deflection under force. Polycarbonates can be made clear so that the mounting of the antenna 112 and the condition in the plenum can be viewed from the top of the tile. The low loss disk 106 can be made from any material that has a low dielectric constant. For example, the low loss disk 106 can be made of any desired type of plastic, glass, fiberglass, wood, concrete or other low dielectric material as set forth above. In addition, the low loss disk 106 need not be clear, but can be opaque or partially optically transmissive. Since the low loss disk 106 is round and sits on a circular plate flange 116, support is provided around the entire periphery of the low loss 106. A low loss disk 106 having a diameter of 6 inches and a thickness of one half inch can withstand forces of over 1500 pounds per square inch. As such, heavy objects can be moved over the low loss disk 106 without fear of breakage. Also, the circular shape of the low loss disk 106 prevents the low loss disk 106 from falling through the opening 104. Although the low loss 106 is shown as being circular and the cylindrical tile bracket 108 is also shown as being circular, any desired shape can be used. In that regard, the cylindrical tile bracket 108 may be an oval tile bracket, a square tile bracket, a rectangular tile bracket, etc. Similarly, the low loss disk 106 may have different shapes according to the shape of the tile bracket. As such, the low loss disk 106 may be a plastic insert that has a shape that fits the opening 104. The cylindrical tile bracket 108 is simply a tile bracket that also has the shape that matches the opening 104.

Figure 4:
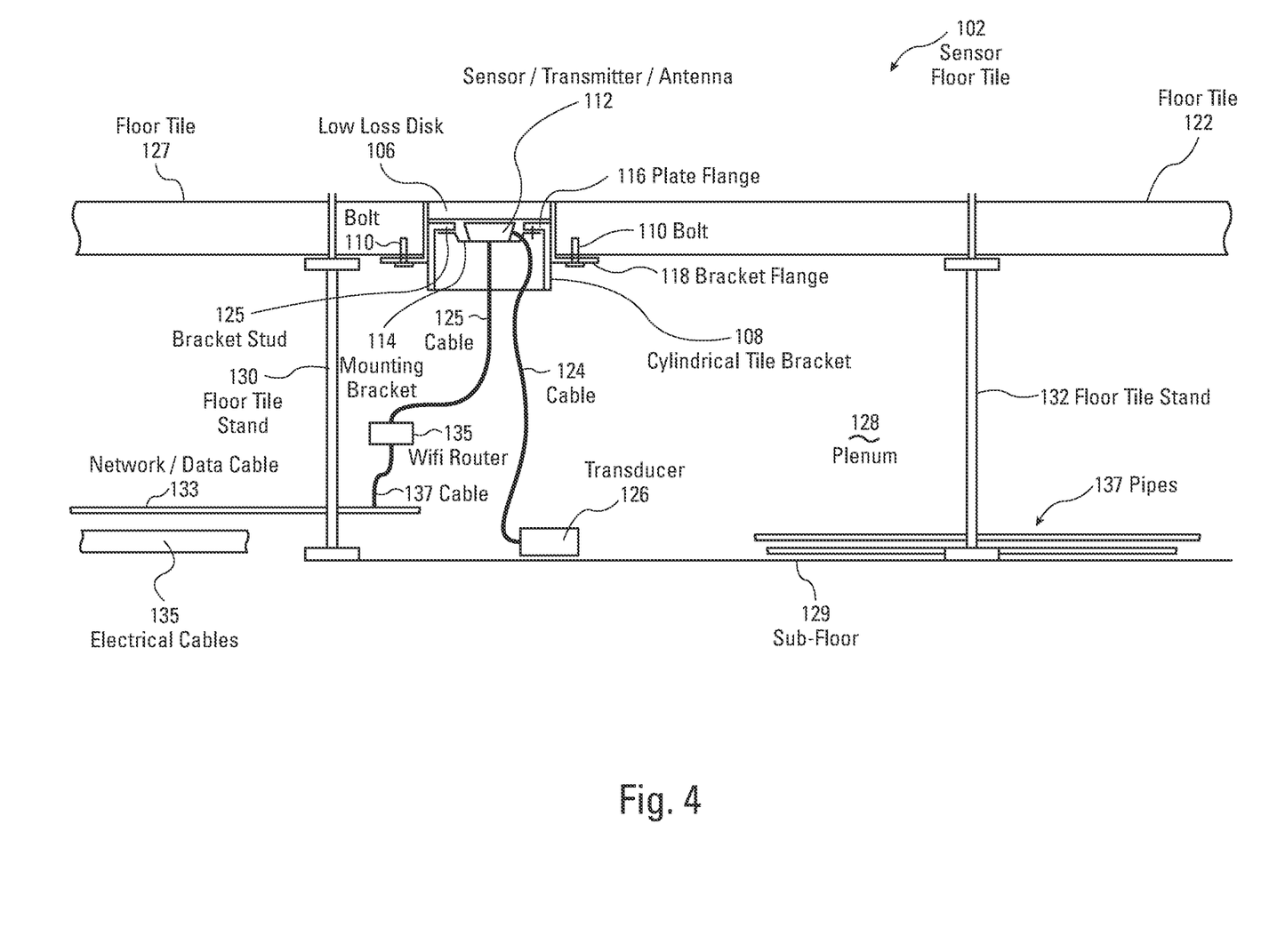
FIG. 4 is a side cutaway view of an embodiment of a raised floor system.

As illustrated in FIG. 4, a typical raised floor system may include a number of floor tiles 127, 102, 122, that are supported by floor tile stands such as floor tile stand 130 and floor tile stand 132. The space between the floor tiles 127, 102 and 122 and a sub-floor 129 is the plenum 128. As discussed above, utilities such as plumbing, electrical utilities, and data cables can be run through the plenum 128. Pipes 137 can be run through the plenum 128, as well as electrical cables 135 and a network/data cable 133. Occasionally, it is necessary to access these utilities because of leaks or additional connections that need to be made to the electrical cables 135 or network/data cable 133. The floor tiles can be easily removed to access the pipes 137, electrical cables 135 or network/data cable 133. In addition, air conditioning and heating, in the form of forced air, can also be run through the plenum 128. The use of floor tiles allows quick and easy access to the plenum 128 to correct any problems with the utilities or make changes to the utility system.

FIG. 4 also illustrates a cutaway view of the cylindrical tile bracket 108, and the manner in which the cylindrical tile bracket 108 is mounted to the sensor floor tile 102. The cylindrical tile bracket 108 is placed through the bottom of the sensor floor tile 102 into the opening 104 in the sensor floor tile 102. Bracket flange 118 has openings that allow bolts 110 to connect the cylindrical tile bracket 108 to the bottom of the sensor floor tile 102. The cylindrical tile bracket 108 is mounted in the opening 104 so that the plate flange 116 provides a round surface on which the low loss disk 106 is placed. The height of the top surface of the plate flange 116 allows the low loss disk 106 to sit within the opening 104 and be flush with the top surface of the sensor floor tile 102. Sensor/transmitter/antenna 112 is mounted with a mounting bracket 114 that is connected to the bottom surface of the plate flange 116 by bracket studs 123, 125 so that the top of the antenna portion of the sensor/transmitter/antenna 112 is pushed against the bottom surface of the low loss disk 106. The low loss disk 106 is selected from a material that has high transmissivity of radio frequency waves, which are transmitted by the antenna portion of sensor/transmitter/antenna 112. The sensor/transmitter/antenna 112 is connected to transducer 126, in one embodiment, via cable 124. The transducer 126 generates a data signal that is representative of the particular property that is being sensed by the sensor 112. The transducer 126 may generate a digital or analog electrical signal that is representative of certain conditions that exist at the location of transducer 126. The sensor/transmitter/antenna 112 transmits an RF signal through the low loss 106. Wi-Fi router 135 is connected by cable 137 to network cable 133. Wi-fi router 135 is connected to the sensor/transmitter/antenna 112 by way of cable 125. The Wi-fi router 135 is capable of transmitting and receiving Wi-fi signals so that the Wi-fi signals can be transmitted by the sensor/transmitter/antenna 112 and received by the sensor/transmitter/antenna 112 through the low loss disk 106. In this manner, Wi-fi services can be provided by the sensor floor tile 102 as disclosed in more detail below.

Transducer 126, illustrated in FIG. 4, can sense various properties. For example, transducer 126 can sense temperature, humidity, air flow, differential pressure, barometric pressure, physical force and other parameters. For differential pressure measurements, a hole can be formed through the low loss disk 106 and a plastic tube from a differential pressure sensor 112 can be mounted in the sensor floor tile 102 to detect pressure above the sensor floor tile 102, through a hole drilled in the low loss disk 106. Another tube can be attached to the differential pressure sensor 112, which measures air pressure at any desired location in the plenum 128. In this manner, differential pressure can be detected between the space above the sensor floor tile 102 and the desired location in the plenum 128.

The sensor/transmitter/antenna 112, in one embodiment, transmits radio frequency signals at about 900 megahertz. In other embodiments, sensor/transmitter/antenna 112 transmits radio frequency signals at 2.4 gigahertz. Batteries located in the sensor/transmitter/antenna 112 have a guaranteed lifetime of up to twelve years. This is possible since the sensors sense a particular condition on a periodic basis and not continuously. For example, sensor/transmitter/antenna 112 may sample each minute, each several minutes or each hour. Other sensors may only need to sense once or twice a day. The sensing operation and generation of a sensing signal on a periodic basis consumes very little power. Consequently, there is no need to connect the sensor/transmitter/antenna 112 or transducer 126 to a power source. Further, it is simple and easy to lift the sensor floor tile 102 and replace the battery pack and the sensor/transmitter/antenna 112 once every twelve years.

Although the transducer 126, illustrated in FIG. 4, is illustrated as a spot sensor, various other sensors can be utilized. For example, cable leak detectors can be laid out on the sub-floor 129 in a matrix. Leak detection cables and electronics can be employed that detect the specific location of a leak along the length of the leak detection cable so that a specific location can be provided for a leak. This is disclosed in more detail in U.S. Pat. Nos. 7,212,009, 7,081,759, 6,144,209, 8,601,679, 9,755,389, 8,063,309, 8,234,910 and 8,256,269, which are specifically incorporated herein, by reference, for all that they disclose and teach.

The sensor floor tile 102, as illustrated in FIG. 4, can be a retrofit floor tile, such as by retrofitting an existing floor tile, such as floor tile 122. In that regard, the cost of installing a sensor floor tile 102 can be reduced by retrofitting a regular floor tile 122. This can be easily done by simply drilling a six-inch round hole in the floor tile 122 and mounting the cylindrical tile bracket 108 in the six-inch opening.

Figure 5:
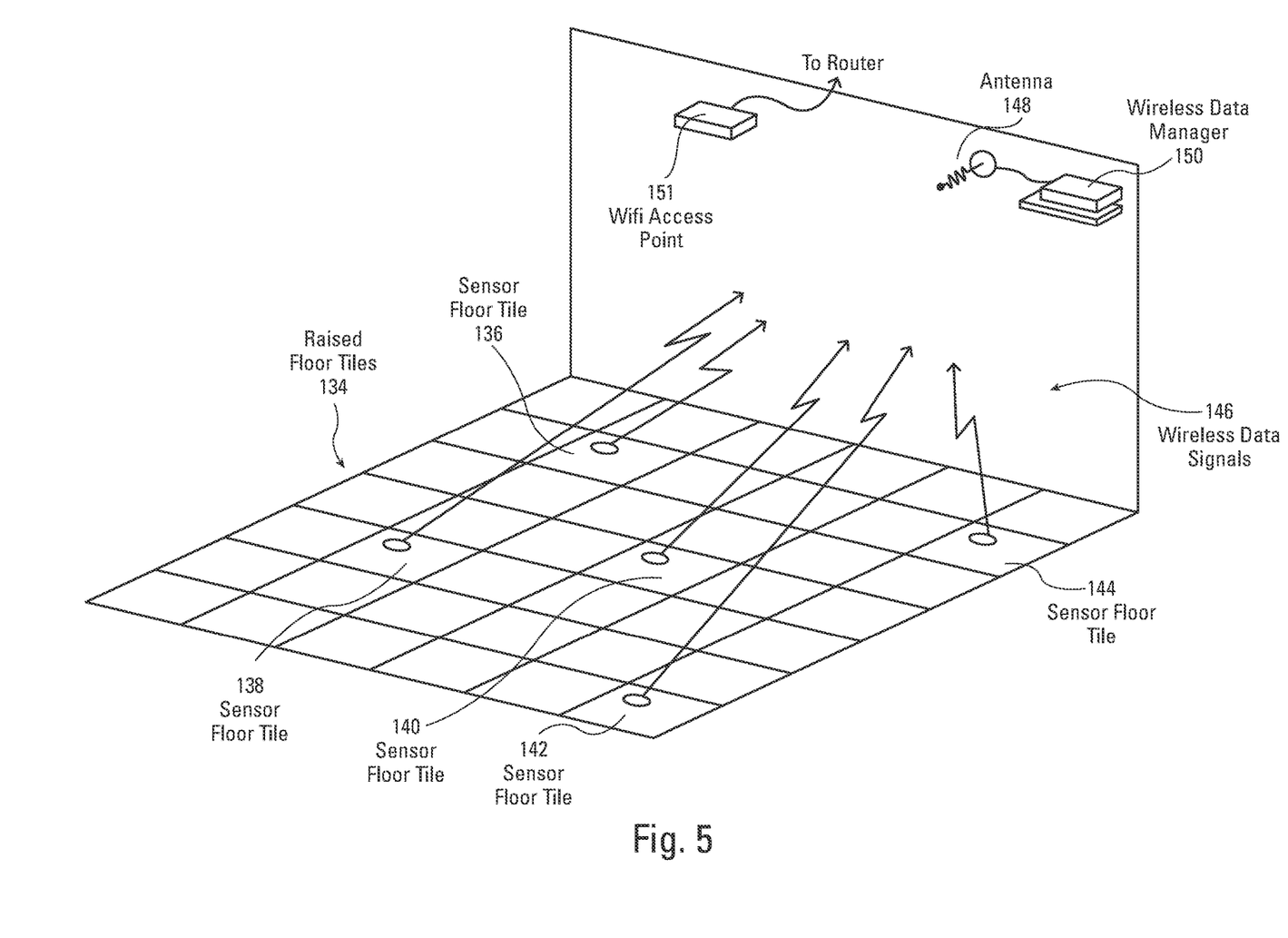
FIG. 5 is an isometric view illustrating an implementation of sensor floor tiles laid out on a raised floor system that communicate with a wireless data manager.

FIG. 5 is a schematic isometric view of a raised floor tile system. The raised floor tile system, using sensor tiles, communicates with a wireless data manager 150, or to a Wi-fi access point 151, which in turn, is connected to a router. As illustrated in FIG. 5, a room such as a computer room, data center, clean room, office space, etc., has a plurality of raised floor tiles 134. Of those raised floor tiles 134, a number of the floor tiles are sensor floor tiles that may sense various conditions. In a very large area such as a data center, a number of sensor floor tiles, such as sensor floor tile 136, sensor floor tile 138, sensor floor tile 140, sensor floor tile 142 and sensor floor tile 144, may be used to detect humidity, temperature, pressure, water leaks, differential pressure, airflow and other conditions at various locations. As also illustrated in FIG. 5, the radio frequency wireless data signals 146 are transmitted through the plastic disks in the sensor floor tiles 136-144 and are received by antenna 148 or Wi-fi access point 151. Antenna 148 can be mounted in a raised location on a wall or on a ceiling or in a drop ceiling in the room. A wireless data manager 150 receives the data transmitted by the wireless data signals 146 and detects that data. The wireless data manager 150 may be connected to a wired network in the building or may transmit the processed data signals via antenna 148, or a separate antenna (not shown), to a network or other device.

The sensor floor tiles illustrated in FIG. 5 can also function as Wi-Fi transmitters, as set forth above, with respect to Wi-Fi router 135 of FIG. 4. For example, the sensor floor tiles can be distributed throughout a building or large room, such as those that exist in data centers, to provide an antenna to transmit Wi-Fi signals to users located within the room or building. Wi-Fi service can be provided by Wi-Fi router 135 (FIG. 4) in the plenum 128 of FIG. 4. The Wi-Fi router 135 can be connected to an antenna mounted to the floor tile 102 with the mounting bracket 114 so that an Internet connection can be provided to users via the antenna mounted underneath the low loss disk 106.

Figure 6:
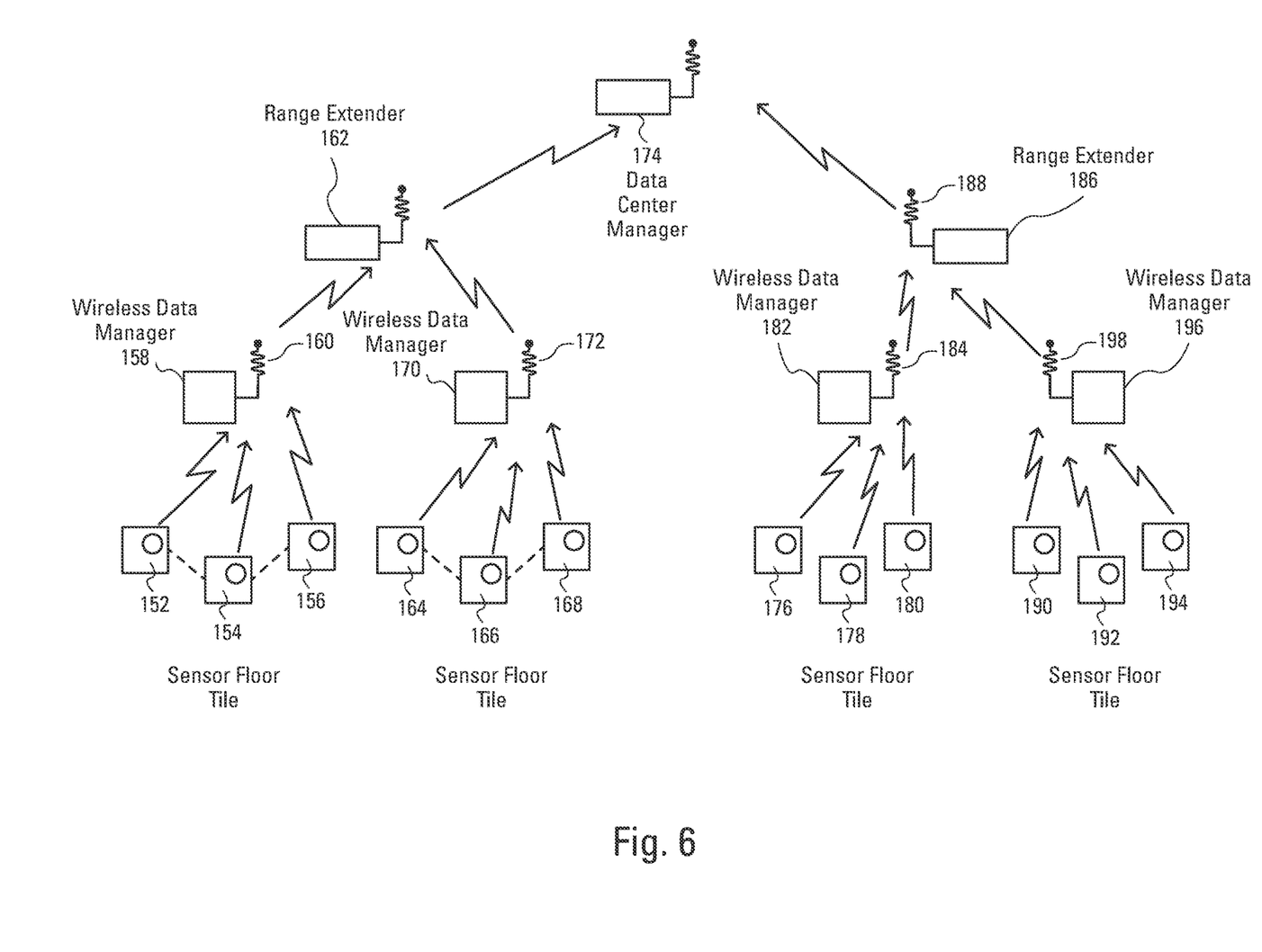
FIG. 6 is a schematic illustration of an architectural structure of one embodiment of a data collection system using sensor floor tiles.

FIG. 6 is a schematic layout of an embodiment of an architecture for transmission of sensor signals to a monitoring system. As illustrated in FIG. 6, sensor floor tiles 152, 154, 156 as well as many other sensor floor tiles, transmit sensor signals to antenna 160 of a wireless data manager 158, such as illustrated in FIG. 5. Similarly, sensor floor tiles 164, 166, 168, as well as possibly many other sensor floor tiles, transmit sensor signals to antenna 172 of wireless data manager 170. Wireless data manager 158 transmits the processed sensor data from sensor floor tiles 152, 154, 156 to range extender 162. Similarly, wireless data manager 170 transmits sensor data from sensor floor tiles 164, 166, 168 to range extender 162. Range extender 162 then transmits all of the sensor signals to a data center manager 174. The data center manager 174 may then be connected to either a local network or the Internet to transmit information to a remote location, if necessary. Many data centers, as well as large buildings, have proprietary monitoring systems, which utilize the data provided to the data center manager 174.

Similarly, sensor floor tiles 176, 178, 180 transmit sensor signals to antenna 184 of the wireless data manger 182 that processes the wireless data signals. Sensors 190, 192, 194 transmit the wireless sensor data to antenna 198 of wireless data manager 196, which processes the sensor data. Both wireless data manager 182 and wireless data manager 196 transmit the data to antenna 188 of range extender 186. Range extender 186 transmits the data to the data center manager 174. Of course, the data center 174 can directly receive the data from the wireless data managers if the data center manager 174 is located sufficiently close to the wireless data managers. As indicated above, the data center manager 174 can be connected to a local network or the Internet through either a hardwired network connection or a wireless connection. Various monitoring and security systems can be used, and many buildings, data centers, computer rooms, etc., have proprietary monitoring systems. One exemplary monitoring system is the Falcon system that is disclosed in U.S. Pat. No. 9,420,042, which is specifically incorporated herein by reference, for all that it discloses and teaches. In that regard, Network Management Systems (NMS) and Building Management Systems (BMS) are utilized by various monitoring and security companies. Network Operation Centers (NOCs) can display status signals, including alarm signals for monitoring systems that allow monitoring personnel to view and manage the infrastructure of data centers, clean rooms, computer rooms and office spaces.

Figure 7:
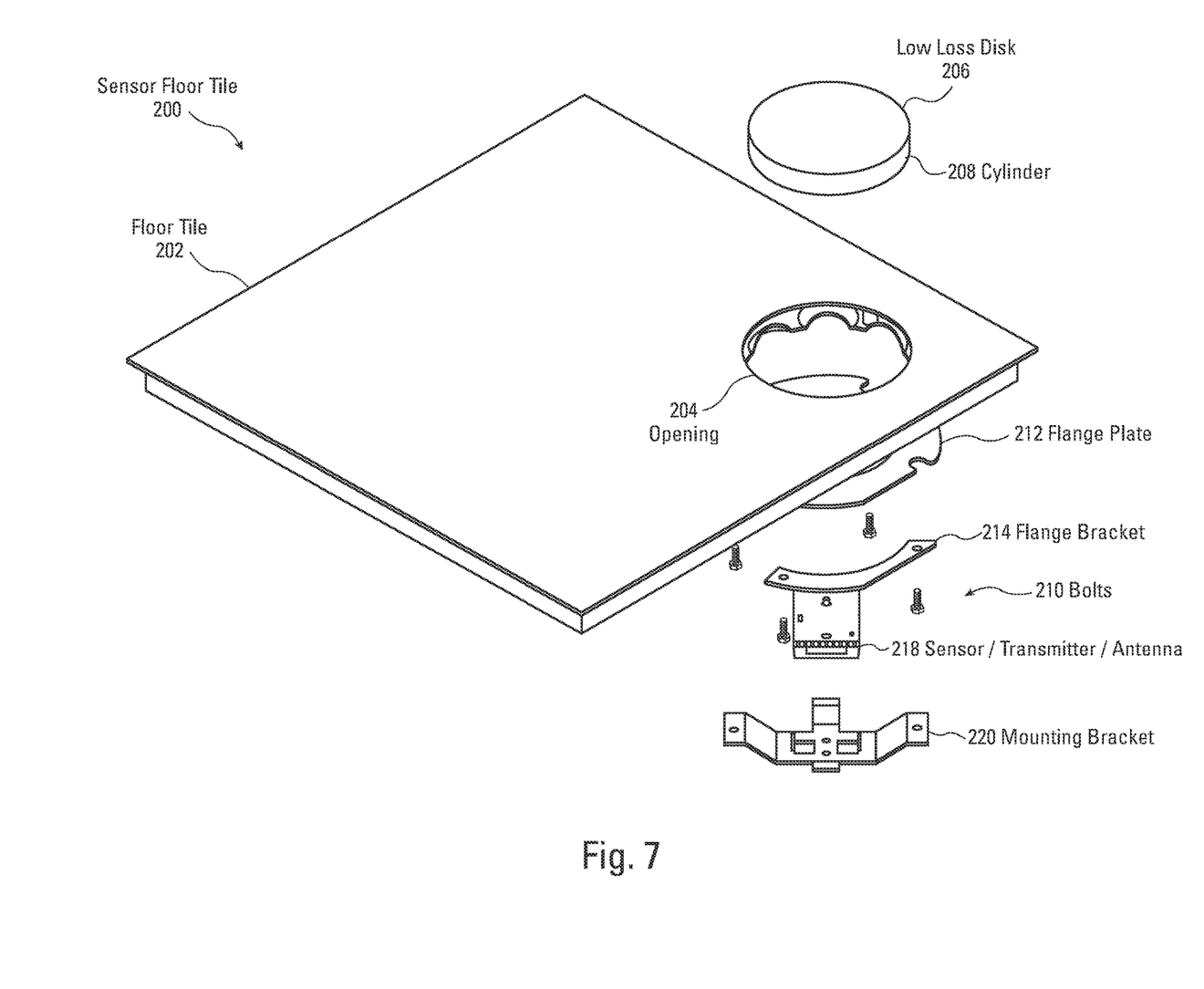
FIG. 7 is a schematic isometric top exploded view of another embodiment of the invention.

FIG. 7 is a schematic isometric top view of another embodiment of the sensor floor tile 200 of the present invention. As illustrated in FIG. 7, the floor tile 202 has an opening 204. Low loss disk 206 is the size and shape to fit within the opening 204. Although a round low loss disk 206 and a round opening 204 shown, any desired shape can be used. The low loss disk 206 has a cylindrical portion 208 that has a depth that matches the depth of the floor tile 202. Flange plate 212 is secured to the bottom portion of the floor tile 202 with flange bracket 214, flange bracket 216 (FIG. 8) and bolts 210. The flange plate 212 provides a surface on which the bottom of the cylinder 208 of the low loss disk 206 rests so that the top surface of the low loss disk 206 is flush with the top surface of the floor tile 202. Mounting bracket 220 holds the sensor/transmitter/antenna 218 against the interior portion of the cylinder 208 of the low loss disk 206.

Figure 8:
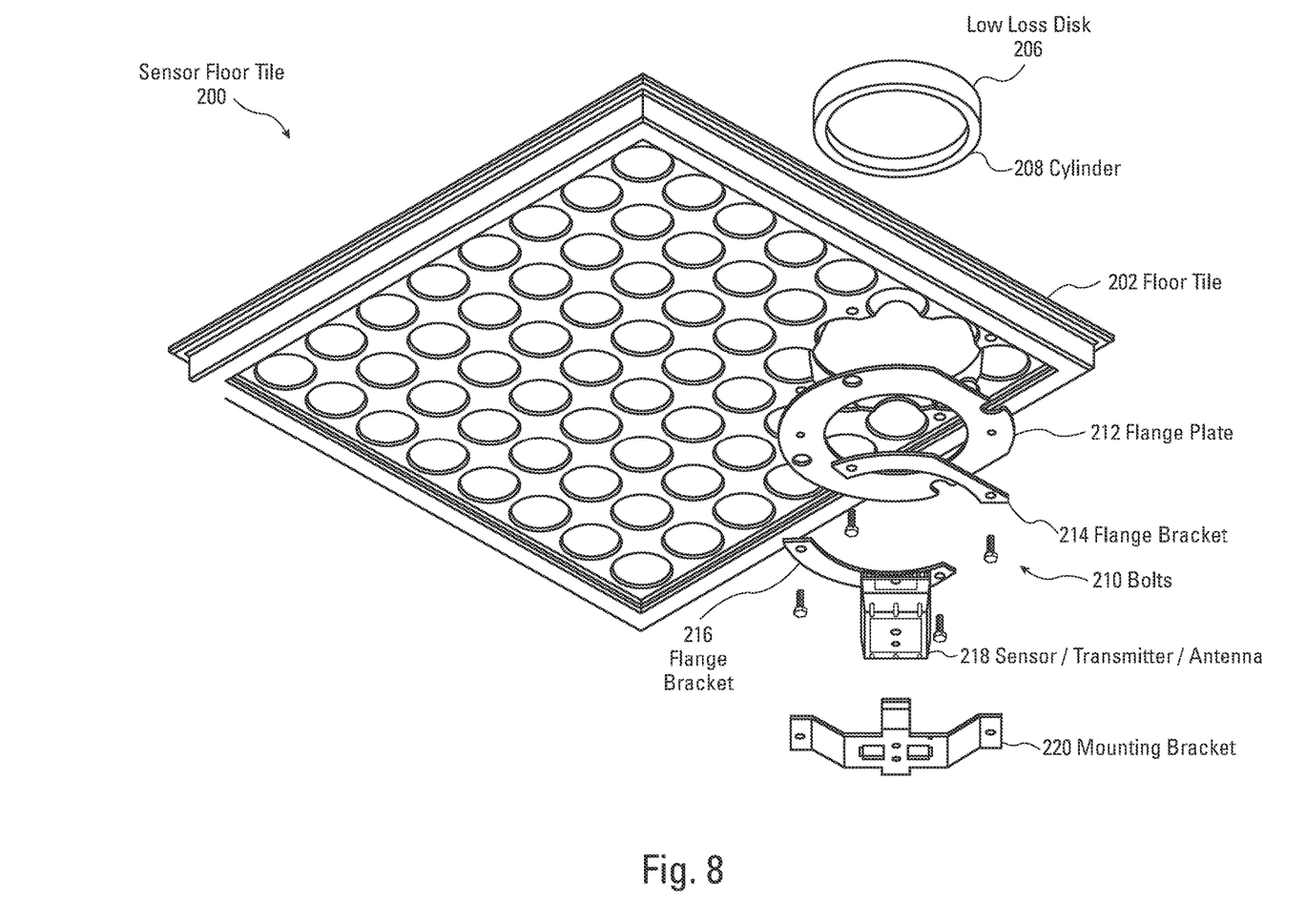
FIG. 8 is a schematic isometric bottom view of the embodiment of FIG. 7.

FIG. 8 is a schematic bottom exploded view of the sensor floor tile 200. As illustrated in FIG. 8, the low loss disk 206 includes a cylinder 208 that extends downwardly from the top surface of the low loss disk 206. Cylinder 208 leaves an open area on the inside portion of the cylinder 208 in which the sensor/transmitter/antenna 218 is placed. The depth of the cylinder 208 extends through the thickness of the floor tile 202 to rest on the flange plate 212 so that the top surface of the low loss disk 206 is flush with the top surface of the floor tile 202. Flange brackets 214, 216 are engaged by bolts 210 which extend through the flange brackets 214, 216, the flange plate 212 and into threaded openings in the bottom surface of the floor tile 202. In this manner, the flange plate 212 is held in place at the opening 204 and provides a plate surface on which the bottom of the cylinder 208 rests. Sensor/transmitter/antenna 218 fits into the mounting bracket 212 which holds the sensor/transmitter/antenna 218 in the internal portion of the cylinder 208. Mounting bracket 220 is held in place by two of the bolts 210.

Figure 9:
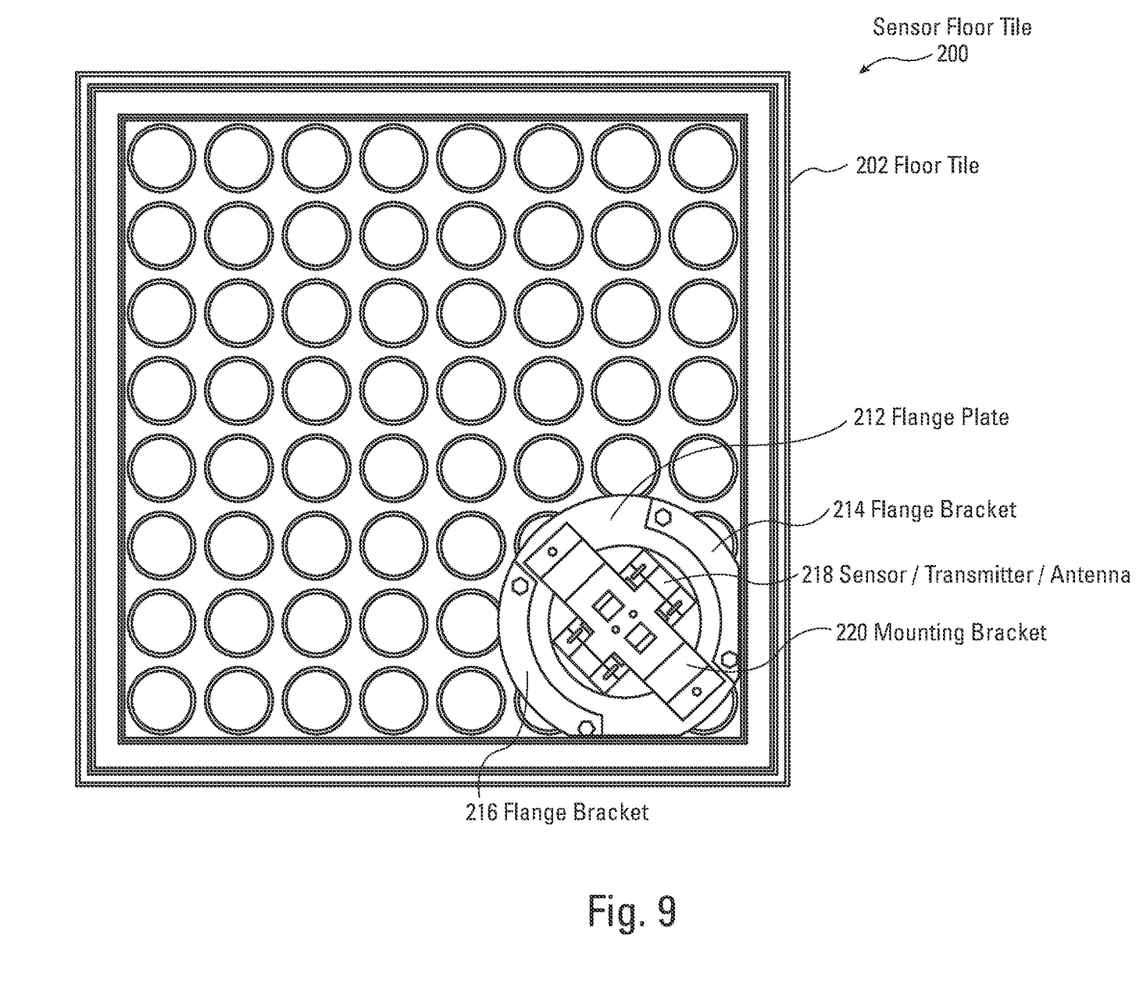
FIG. 9 is a schematic bottom view of the embodiment of FIG. 7.

FIG. 9 is a schematic bottom view of the sensor floor tile 200 in an assembled construction. As illustrated in FIG. 9, the bottom surface of the system is illustrated. Flange brackets 214, 216 hold the flange plate 212 on the bottom surface of the floor tile 202. Mounting bracket 220 holds the sensor/transmitter/antenna 218 inside of the cylinder portion 208 of the low loss disk 206.

Consequently, the present invention provides for the wireless transmission of various sensor data using sensor floor tiles that utilize an RF frequency transmissive plate that transmits sensor signals to a wireless data manager. In addition, Wi-Fi signals can be transmitted through the low loss disks in the floor tiles to allow network connection to provide distributed Internet connections in which the sensor floor tiles are utilized.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A floor tile comprising:
   a metal floor tile having an opening that extends from a top surface to a bottom surface of said floor tile;
   a plurality of sensors located on said bottom surface of said floor tile that generate electrical sensor signals;

a transmitter operatively connected to said sensors that generates radio frequency signals in response to said electrical sensor signals;
a flange plate that is mounted to said bottom surface of said floor tile at a predetermined distance below said top surface of said floor tile;
an insert disposed in said opening and placed against said flange plate, said insert having a thickness that corresponds to said predetermined distance so that said insert is flush with said top surface of said floor tile when said insert is disposed in said opening and placed against said flange plate, said insert made from a material that has high transmissivity of said radio frequency signals;
an antenna disposed adjacent to said insert that is configured to wirelessly transmit said radio frequency signals;
wherein said radio frequency signals are wirelessly transmitted from said antenna through said insert.

2. The floor tile of claim 1 wherein one of said sensors comprises a transducer that detects barometric pressure.

3. The floor tile of claim 1 wherein one of said sensors comprises a transducer that detects differential pressures.

4. The floor tile of claim 1 wherein one of said sensors comprises a transducer that detects humidity.

5. The floor tile of claim 1 wherein one of said sensors comprises a transducer that detects temperature.

6. The floor tile of claim 1 wherein one of said sensors comprises a transducer that detects air flow.

7. The floor tile of claim 1 wherein one of said sensors comprises a pressure sensor disposed on said floor tile that detects pressure.

8. The floor tile of claim 7 wherein the plurality of sensors includes additional sensors disposed on corners of said floor tile.

9. A floor tile comprising:
a metal floor tile having an opening that extends from a top surface to a bottom surface of said floor tile;
a bracket flange connected to said bottom surface of said floor tile;
a plate flange attached to said bracket flange that extends into said opening to a location that is disposed a predetermined distance below said top surface of said floor tile;
a plurality of sensors located on said bottom surface of said floor tile that generate electrical sensor signals;
a transmitter operatively connected to said sensors that generates radio frequency signals in response to said electrical sensor signals;
an insert disposed in said opening and placed against said plate flange, said insert having a thickness that corresponds to said predetermined distance so that said insert is flush with said top surface of said floor tile, said insert made from a material having high transmissivity of radio frequency signals;
an antenna connected to said transmitter that transmits said radio frequency signals through said insert.

10. The floor tile of claim 9 wherein one of said sensors comprises a transducer that detects barometric pressure.

11. The floor tile of claim 9 wherein one of said sensors comprises a transducer that detects differential pressures.

12. The floor tile of claim 9 wherein one of said sensors comprises a transducer that detects humidity.

13. The floor tile of claim 9 wherein one of said sensors comprises a transducer that detects temperature.

14. The floor tile of claim 9 wherein one of said sensors comprises a transducer that detects air flow.

15. The floor tile of claim 9 wherein one of said sensors comprises a pressure sensor disposed on said floor tile that detects pressure.

16. The floor tile of claim 15 wherein the plurality of sensors includes additional sensors disposed on corners of said floor tile.

17. A method of transmitting sensor data in a raised floor system comprising:
providing a floor tile with a top surface and a bottom surface and an opening that extends through a thickness of said floor tile between said top surface and said bottom surface;
generating sensor signals from a plurality of sensors located on said bottom surface of said floor tile;
generating radio frequency signals from an antenna operatively connected to said sensors in response to said sensor signals;
mounting a flange plate on said bottom surface of said floor tile at a predetermined distance below said top surface;
placing an insert in said opening that rests on said flange plate, said insert having a thickness that corresponds to said predetermined distance so that a top surface of said insert is flush with said top surface of said floor tile when said insert is disposed in said opening, said insert being transmissive to said radio frequency signals;
securing said antenna under said insert when said insert is disposed in said opening so that said radio frequency signals are transmitted through said insert.

18. The method of claim 17 wherein said method of generating sensor signals comprises generating pressure sensor signals that indicate pressure on said floor tile.

19. The method of claim 17 wherein said method of generating sensor signals comprises generating barometric sensor signals.

20. The method of claim 17 wherein said method of generating sensor signals comprises generating differential pressure signals.

21. The method of claim 17 wherein said method of generating sensor signals comprises generating humidity signals.

22. The method of claim 17 wherein said method of generating sensor signals comprises generating temperature signals.

23. The method of claim 17 wherein said method of generating sensor signals comprises generating airflow signals.

24. A method of transmitting sensor data in a raised floor system comprising:
providing a metal floor tile with a top surface and a bottom surface and an opening that extends through a thickness of said floor tile between said top surface and said bottom surface;
generating sensor signals from a plurality of sensors located on said bottom surface of said floor tile;
generating radio frequency signals from an antenna operatively connected to said sensors in response to said sensor signals;
connecting a bracket flange to said bottom surface of said floor tile, said bracket flange having a plate flange that extends into said opening and is located at a predetermined distance below said top surface of said floor tile;
placing an insert in said opening such that said insert rests on said plate flange, said insert having a thickness that corresponds to said predetermined distance so that a top surface of said insert is flush with said top surface of said floor tile, said insert made from a material having high transmissivity of radio frequency signals;

transmitting said radio frequency signals from said antenna through said insert.

25. The method of claim 24 wherein said method of generating sensor signals comprises generating pressure sensor signals that indicate pressure on said floor tile.

26. The method of claim 24 wherein said method of generating sensor signals comprises generating barometric sensor signals.

27. The method of claim 24 wherein said method of generating sensor signals comprises generating differential pressure signals.

28. The method of claim 24 wherein said method of generating sensor signals comprises generating humidity signals.

29. The method of claim 24 wherein said method of generating sensor signals comprises generating temperature signals.

30. The method of claim 24 wherein said method of generating sensor signals comprises generating airflow signals.

* * * * *